_US005934069A_

United States Patent [19]
Hertl et al.

[11] Patent Number: 5,934,069
[45] Date of Patent: Aug. 10, 1999

[54] IN-LINE ADSORBER SYSTEM

[75] Inventors: William Hertl, Corning; Donald L. Guile, Horseheads; Mallanagouda D. Patil, Corning; Jimmie L. Williams, Painted Post, all of N.Y.

[73] Assignee: Corning Incorporated, Corning, N.Y.

[21] Appl. No.: 09/023,353

[22] Filed: Feb. 13, 1998

Related U.S. Application Data

[62] Division of application No. 08/484,617, Jun. 8, 1995, Pat. No. 5,787,707.

[51] Int. Cl.⁶ .................................................. F01N 3/00
[52] U.S. Cl. ............................. 60/274; 60/288; 60/297; 60/311; 60/307
[58] Field of Search .................... 60/274, 287, 288, 60/289, 297, 307, 311

[56] References Cited

U.S. PATENT DOCUMENTS

| | | |
|---|---|---|
| 3,144,309 | 8/1964 | Sparrow . |
| 3,699,683 | 10/1972 | Tourtellotte et al. . |
| 3,783,619 | 1/1974 | Alquist . |
| 3,813,226 | 5/1974 | Heitland . |
| 3,966,443 | 6/1976 | Okano et al. . |
| 3,988,890 | 11/1976 | Abthoff et al. . |
| 3,995,423 | 12/1976 | Aoki et al. . |
| 4,023,360 | 5/1977 | Wossner et al. . |
| 4,196,170 | 4/1980 | Cemenska . |
| 4,625,511 | 12/1986 | Scheitlin et al. . |
| 5,051,244 | 9/1991 | Dunne et al. . |
| 5,067,319 | 11/1991 | Moser . |
| 5,089,236 | 2/1992 | Clerc . |
| 5,125,231 | 6/1992 | Patil et al. . |
| 5,140,811 | 8/1992 | Minami et al. . |
| 5,144,796 | 9/1992 | Swars . |
| 5,211,012 | 5/1993 | Swars . |
| 5,271,906 | 12/1993 | Yuuki et al. . |
| 5,315,824 | 5/1994 | Takeshima . |
| 5,449,499 | 9/1995 | Bauer et al. . |
| 5,560,201 | 10/1996 | Fujishita et al. ......................... 60/279 |
| 5,634,332 | 6/1997 | Tanaka et al. ........................... 60/284 |

FOREIGN PATENT DOCUMENTS

| | | |
|---|---|---|
| 39 19 343 A1 | 12/1990 | European Pat. Off. . |
| 0 485 179 A3 | 7/1992 | European Pat. Off. . |
| 0 580 931 A1 | 2/1994 | European Pat. Off. . |
| 0 588 315 A1 | 3/1994 | European Pat. Off. . |
| 0 661 098 A2 | 12/1994 | European Pat. Off. . |
| 62-189309 | 8/1987 | Japan . |
| 1-257710 | 10/1989 | Japan . |
| 1275772 | 5/1972 | United Kingdom . |
| 2240486 | 8/1991 | United Kingdom . |
| 2254014 | 9/1992 | United Kingdom . |
| 95/18292 | 7/1995 | WIPO . |

*Primary Examiner*—Thomas E. Denion
*Attorney, Agent, or Firm*—Timothy M. Schaeberle

[57] ABSTRACT

A modified in-line adsorber system capable of meeting the California ultra-low emission vehicle (ULEV) standard using a combination of burn-off catalyst and a modified adsorber constructed with an open flow region of substantially unobstructed flow having a hole or a region of larger cell openings to increase the amount and rate of contact between the exhaust gas and the burn-off catalyst, and thereby reduce the light-off time of the burn-off catalyst. For best effect, the open flow region of the adsorber is positioned along the exhaust stream between the engine and the burn-off catalyst as defined by the exhaust flow path of least resistance.

4 Claims, 11 Drawing Sheets

Deflector    Secondary Air

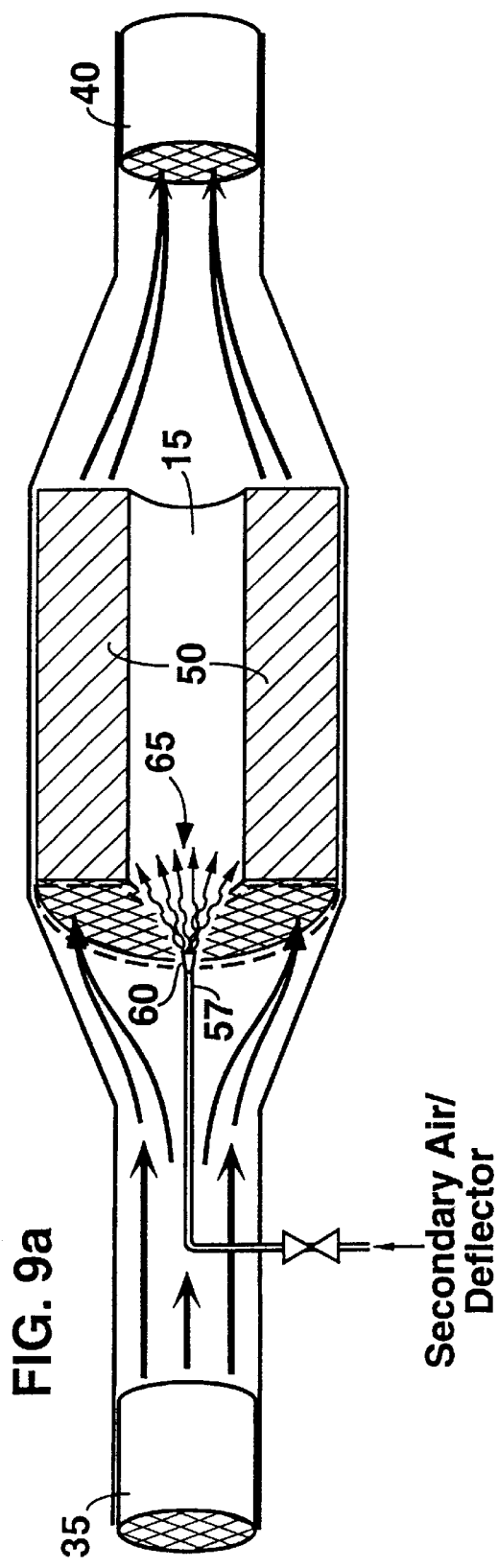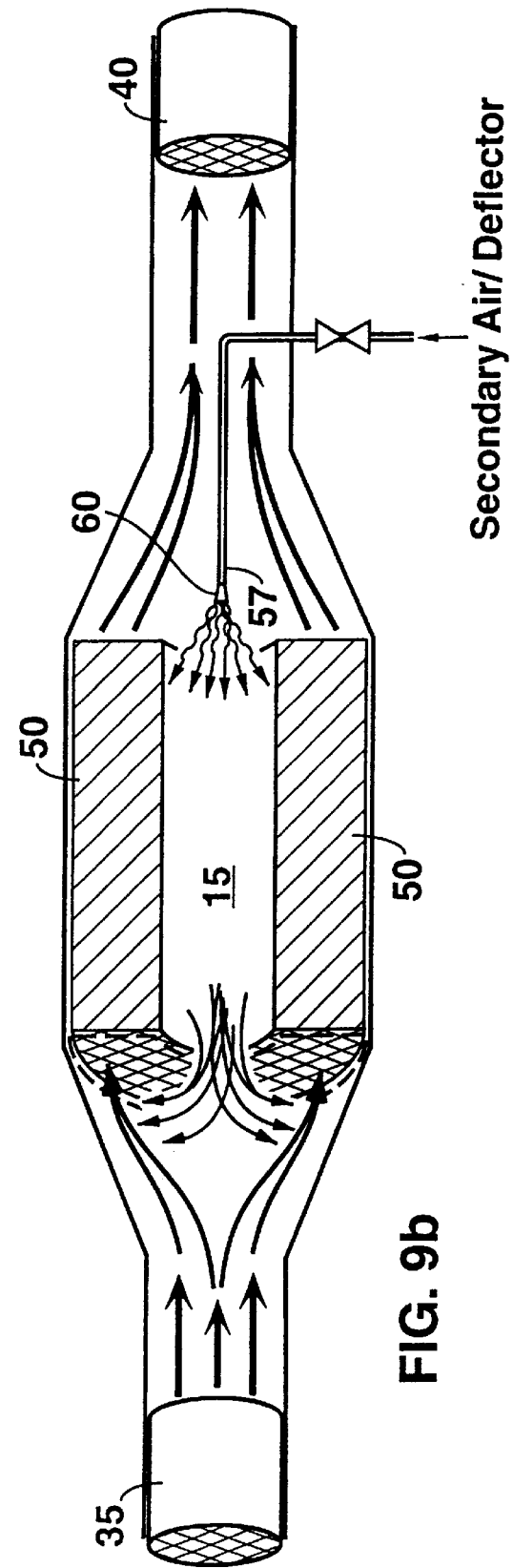

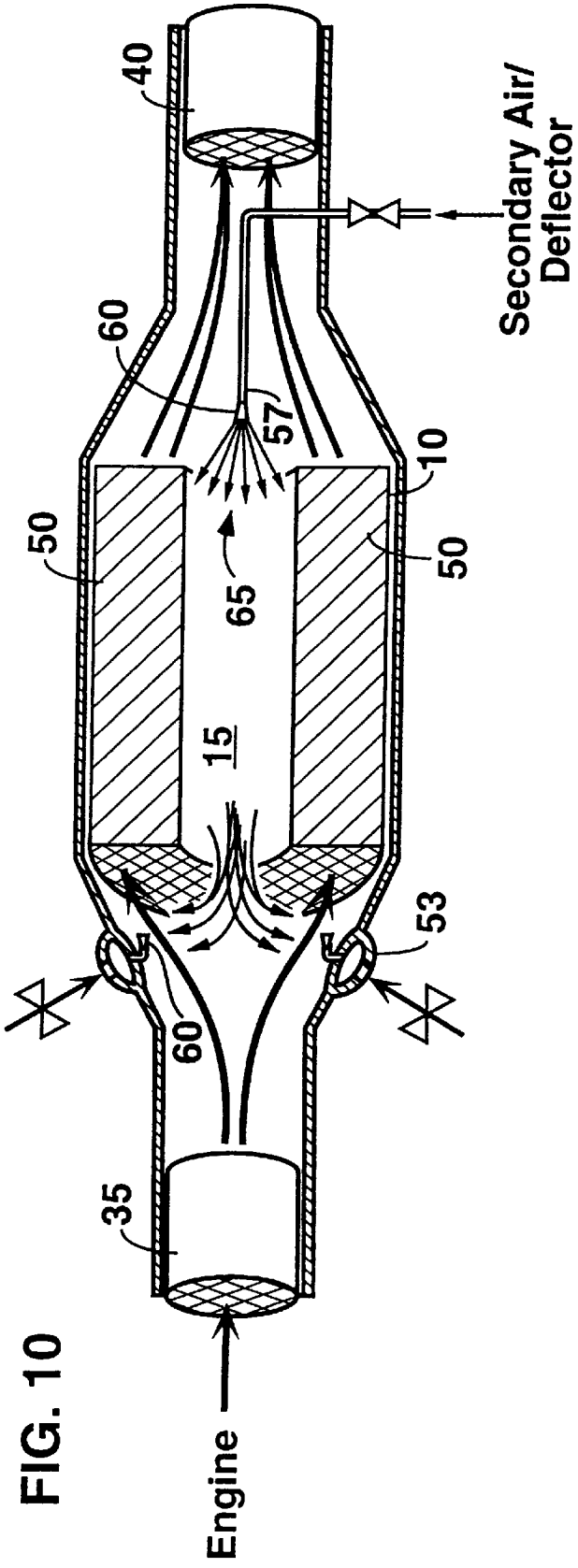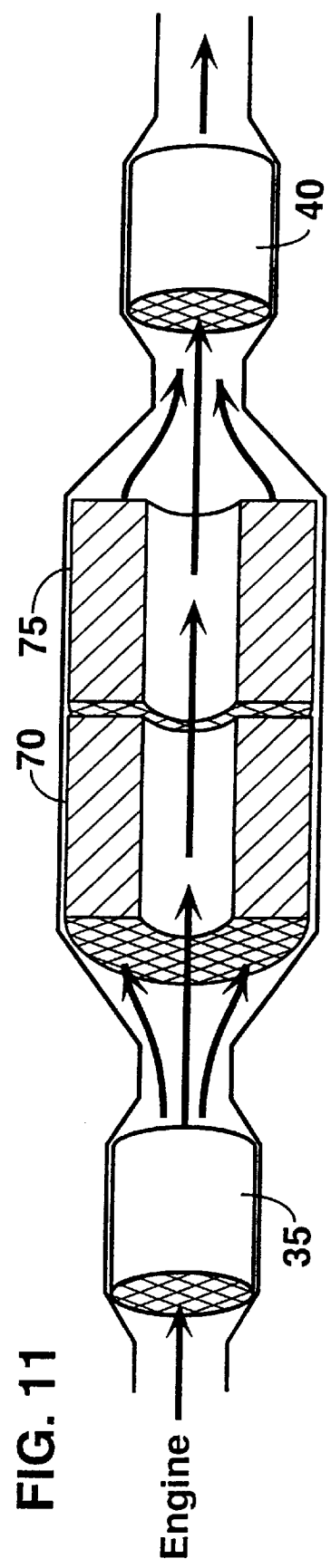
FIG. 10
FIG. 11

IN-LINE ADSORBER SYSTEM

This is a division of application Ser. No. 08/484,617, filed Jun. 8,1995 now U.S. Pat. No. 5,787,707.

BACKGROUND OF THE INVENTION

The invention relates to an in-line adsorber system for an internal combustion engine, capable of meeting the California ultra-low emission vehicle (ULEV) standard, using a modified adsorber construction.

Internal combustion engines emit large amounts of unburned hydrocarbons during the cold start of an engine due to the rich fuel mixture used in such engines, and the necessarily incomplete combustion at start-up. This emission of unburned hydrocarbons continues until the main catalyst reaches its "light-off" temperature, at which point the catalyst begins to convert the hydrocarbons to harmless gases. The typical catalytic light-off time for most internal combustion engine systems is around 50 to 120 seconds, during which time significant amounts of hydrocarbons are emitted into the atmosphere. The actual catalytic light-off time for any system will depend on the position of the catalyst relative to the engine, as well as the noble metal loading. The temperature of the catalyst is elevated by contacting it with the high temperature exhaust gases from the engine, and continuous contact with those gases along with the exothermic nature of the oxidation reactions occurring at the catalyst combine to maintain the catalyst at an elevated temperature.

While catalytic converters are well known for reducing oxides of nitrogen (NOx), and oxidizing hydrocarbons and carbon monoxide from automobile exhaust, these reactions typically take place after the catalyst has attained its light-off temperature. That is, at temperatures generally in the range of 200–350° C. depending on such factors as the noble metal loading and aging of the catalyst. Typically however, seventy to eighty percent of hydrocarbon emissions from automotive vehicles are emitted during about the first minute of engine operation, during which time in most systems, the main catalytic converter has not attained light-off and is therefore, not active. As a result, during cold-start large amounts of hydrocarbons may be discharged into the atmosphere if additional measures are not taken. The problem is made worse by the fact that the engine requires rich fuel-air ratio to operate during cold-start thus, increasing even further the amount of unburned hydrocarbons discharged. Therefore, to increase the effectiveness of automotive emission control systems during cold start, and more importantly, the ULEV standards require that, the amount of hydrocarbons discharged into the atmosphere during cold-start must be kept to extremely low levels.

Various schemes have been proposed for meeting the stringent ULEV standards during cold start including through the use of electrically heated catalysts (EHCs) to reduce the light-off time of the main catalyst. Another suggested scheme includes the use of molecular sieve structures (hydrocarbon adsorbers) to adsorb and hold significant amounts of hydrocarbons until the converter has attained its light-off temperature. Still, other schemes have been suggested involving a combination of electrically heated catalysts and adsorbers. Recently, improved in-line and by-pass exhaust control systems respectively have been disclosed in co-pending, co-assigned U.S. application Ser. No. 08/234,680 and 08/259,459 (both herein incorporated by reference), using bi-metallic valves to control exhaust gas flow during cold-start. In the former, a hollow molecular sieve structure having a bi-metallic valve is used to achieve the ULEV standards. Co-pending, co-assigned U.S. application Ser. No. 08/284,356 (Guile), filed concurrently herewith and herein incorporated by reference, discloses a by-pass adsorber system wherein flow patterns from a secondary air source are used to direct exhaust gas flow to and away from the adsorber during cold-start.

There continues to be a need for, and accordingly, it is the object of the present invention, to provide an even simpler and more improved engine exhaust systems capable of meeting the strict California ULEV standards.

SUMMARY OF THE INVENTION

The invention relates to an engine exhaust system having a burn-off catalyst located downstream from a hydrocarbon adsorber, in which the amount of hydrocarbons emitted during cold-start is significantly reduced by use of a hydrocarbon adsorber constructed to reduce the light-off time of the burn-off catalyst; this being accomplished without the use of valves. Optionally, the exhaust system may further comprise a main catalytic converter or a three-way catalyst (TWC) disposed upstream from the hydrocarbon adsorber.

In one significant aspect, the invention relates to a hydrocarbon adsorber (or molecular sieve structure) having (1) a first region which forms an unobstructed or substantially unobstructed flow path for exhaust gases of an exhaust stream formed between an engine and a burn-off catalyst disposed downstream from the adsorber, and (2) a second region abutting the first region, which forms a more restricted flow path for the exhaust gases than the first region.

In a further aspect, the hydrocarbon adsorber of the invention includes a variable cell honeycomb structure in which the cells forming a first region are larger than the cells forming a second region to cause less restricted flow through the first region than through the second region. Alternatively, the first region occupies the central region of the adsorber, and the second region is the peripheral region surrounding the first region.

In one particular aspect, the invention relates to an engine exhaust system having a main catalyst having a light-off temperature; a housing downstream of the main catalyst, the housing having an inlet and an outlet end, and having disposed therein a molecular sieve structure or hydrocarbon adsorber for adsorbing hydrocarbons, the molecular sieve structure being characterized by a desorption temperature and having a hollow central core; a burn-off catalyst disposed downstream from the adsorber, the burn-off catalyst having a light-off temperature; and diverting means disposed in the housing for passing secondary air to the molecular sieve structure to maintain the sieve temperature at a low level until light-off of the burn-off catalyst has been achieved. Advantageously, the flow pattern of the secondary air is such as to direct a major portion of the exhaust gases of the exhaust stream through the central region of the adsorber after the main catalyst has attained its light-off temperature.

In still another aspect, air diverters are disposed at the inlet end, outlet end, or both ends of the adsorber to control the exhaust gas flow through the central region of the adsorber.

Optionally, additional secondary air injection means can be disposed at the outlet end of the adsorber or just before the burn-off catalyst to provide additional oxygen needed to oxidize desorbed hydrocarbons or to restore stoichiometry as needed during vehicle operation for example. Also, the hydrocarbon adsorber may be catalyzed with catalysts capable of decomposing the NOx, CO and hydrocarbons in the exhaust stream to harmless components.

As used in this specification:

"molecular sieve" refers to crystalline substances or structures having pore sizes suitable for adsorbing molecules. The term is generally used to describe a class of materials that exhibit selective absorption properties. To be a molecular sieve, the material must separate components of a mixture on the basis of molecular size and shape differences. Such materials include silicates, the metallosilicates, metalloaluminates, the $AlPO_4S$, silico-and metalloaluminophosphates, zeolites and others described in R. Szostak, *Molecular Sieves: Principles of Synthesis and Identification*, pages 2–6 (Van Nostrand Reinhold Catalysis Series, 1989);

"zeolites" are crystalline aluminosilicates whose structures are based on a theoretically limitless three-dimensional network of AlOx and SiOy tetrahedra linked by the sharing of oxygen atoms, such as more fully disclosed in U.S. Pat. No. 3,702,886, in British Specification No. 1,334,243, published Oct. 17, 1973, in U.S. Pat. No. 3,709,979, and in U.S. Pat. No. 3,832,449, all of which are herein incorporated by reference;

"monolithic substrate" is any unitary body or substrate formed from, or incorporating molecular sieve material; as used herein, a honeycomb substrate is a form of a monolithic substrate, but a monolithic substrate is not necessarily a honeycomb substrate; "light-off temperature" of a converter is the temperature at which a catalytic converter can convert 50% of carbon monoxide or hydrocarbons or NOx;

"light-off time" of a catalytic converter is the amount of time required to attain light-off temperature;

"fluidics" is used herein to describe the mechanism or process of diverting exhaust gas flow either through or away from the central region of the molecular sieve structure using a smaller stream of fluid; and for ease of discussion, the terms "adsorber" and "adsorption" as used herein are intended to encompass both adsorption and absorption as these terms are generally known to persons skilled in the art and as defined in *Webster's Ninth New Collegiate Dictionary* (1985); it is contemplated that both processes of adsorption and absorption occur in the molecular sieve structure of the invention.

BRIEF DESCRIPTION OF THE DRAWINGS

FIGS. 9a to 9e illustrate another aspect of the invention using fluidics or flow dynamics as defined above to direct flow through and away from the open central core region of the adsorber;

FIGS. 9a and 9b show the use of a cone-shaped flow diverter disposed on the inlet and outlet ends of the adsorber respectively, to direct flow away from the central hole during cold start;

FIGS. 9c and 9d show the optional use of an additional flow diverter at the inlet end of the adsorber to direct air through the hole after light-off and after the first diverter at the outlet end of the adsorber has been deactivated;

FIG. 9e shows the use of a air injection tube possessing a diverter plate to direct flow away from the central hole during cold start;

FIG. 10 is a sectional (longitudinal) view of the system of FIG. 9d showing the direction of exhaust flow before the burn-off catalyst has attained light-off;

FIG. 11 is a sectional (longitudinal) view of another embodiment of the invention using as adsorbers, two molecular sieve structures placed in series in the housing, each having a different or similar hydrocarbon selectivity;

Figure 1:
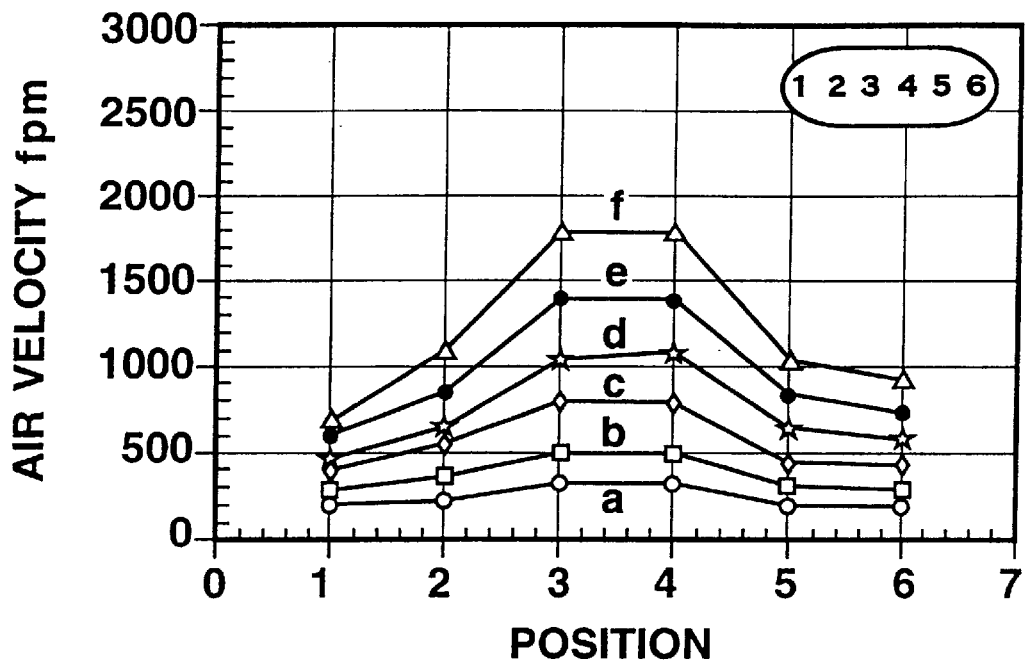
FIG. 1 is a graph illustrating the flow profile across an oval extruded honeycomb substrate in an oval can at various space velocities.

REFERENCE NUMERALS IN THE DRAWINGS 10, 30 . . . adsorber;
15, 32 . . . open flow region;
20 . . . honeycomb adsorber;
22 . . . cells;
25 . . . central region having large cells;
28, 50 . . . peripheral region having normal/smaller cells;
35 . . . a heating device such as an electrically heated honeycomb structure, or a main catalytic converter such as a three-way catalyst, a light-off catalyst or an electrically heated catalyst, close-coupled with the engine;
40 . . . burn-off catalyst;
45 . . . circular air injection port;
47 . . . multiple cone-shaped, directional nozzles;
53 . . . secondary air injection collar;
55 . . . nozzles;
57 . . . air injection port;
60 . . . single cone-shaped nozzle;
65 . . . cone-shaped secondary air stream;
70 . . . ZSM-5-coated cordierite adsorber; and
75 . . . USY-zeolite-coated cordierite adsorber.

80 . . . diverter plate
81 . . . diverter plate support system
82 . . . diverter plate support
83 . . . diverter plate threaded post
85 . . . radially directed secondary air stream

DETAILED DESCRIPTION OF THE INVENTION

The object of the invention, that is, to reduce the light-off time of the burn-off catalyst sufficiently to meet the stringent ULEV standards is achieved by taking advantage of the flow dynamics of the exhaust stream through a monolithic adsorber; light-off is achieved before the adsorber heats up and begins to desorb any trapped hydrocarbons. We have observed that the flow dynamics of the engine exhaust system of the invention is such that the exhaust gases in the exhaust gas stream between an engine and a burn-off catalyst tend to flow through a path of least resistance from the engine and out to the atmosphere. In the standard cone-shaped exhaust can design in which a generally circular honeycomb adsorber is centrally disposed in the can, this path passes through the central region of the adsorber. As a result, the exhaust gases tend to flow through the central region of the cellular adsorber at a faster rate than through the peripheral regions of the structures. For a non-symmetrical can design, the same flow dynamics is observed, that is the exhaust gases tend to flow faster through the path of least resistance to flow. Hereinafter, this flow path of least resistance will be referred to as "the exhaust path."

Figure 2:
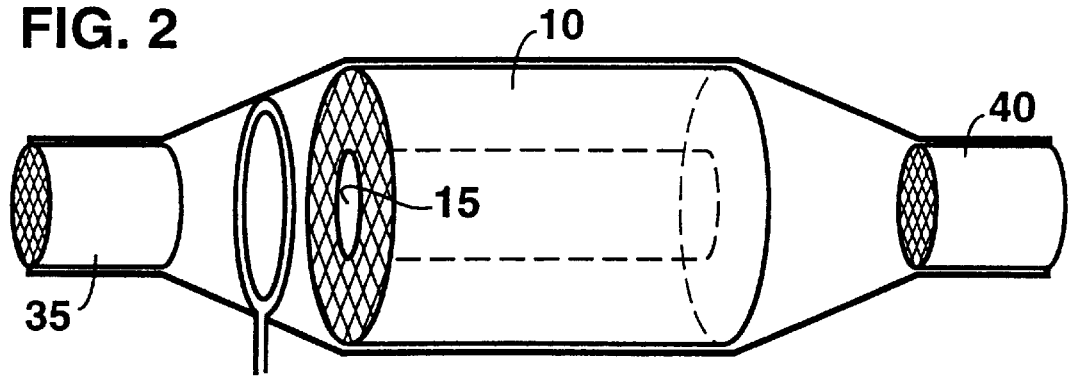
FIG. 2 is a sectional (longitudinal) view of one aspect of the invention showing an exhaust system in which exhaust gas flows from the engine to a main catalyst, thence to the adsorber of the invention having an open flow channel therethrough, and thence to a burn-off catalyst.
Figure 1A:
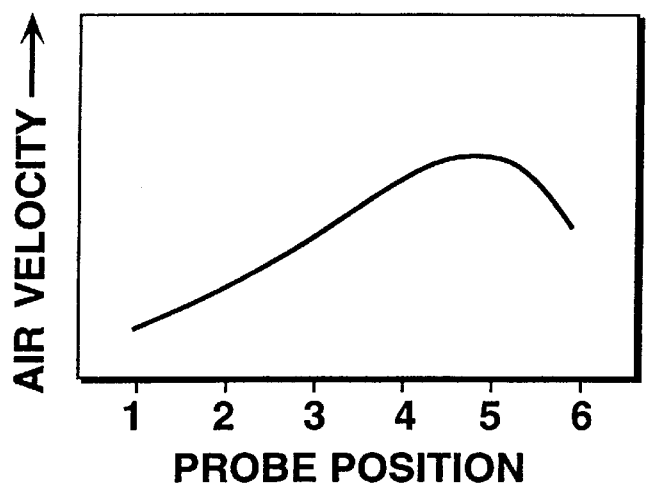
FIG. 1a is a similar graph illustrating the flow profile across an adsorber disposed in a non-symmetrical can design such as shown in FIG. 2a below, but in which the adsorber is a uniform extruded honeycomb structure having no hole therethrough.
Figure 2A:
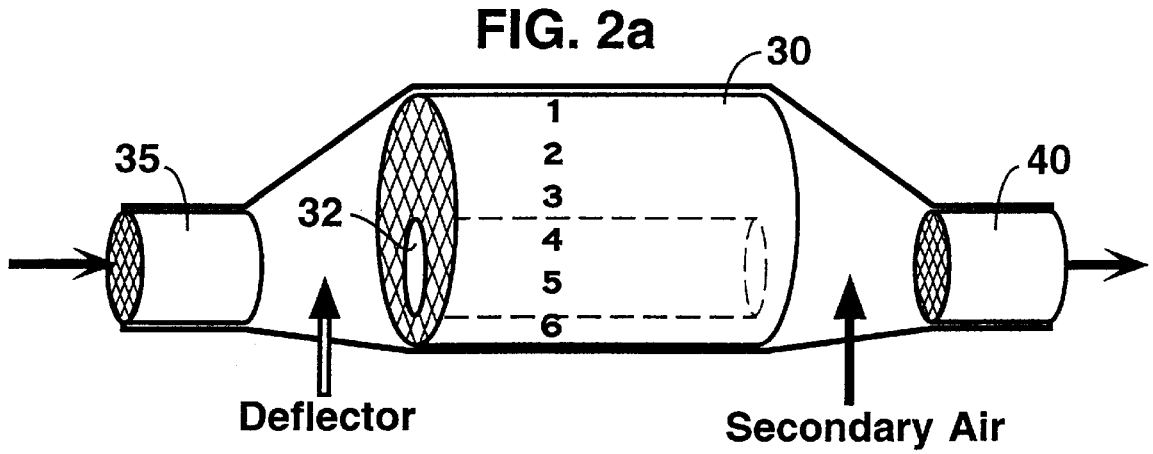
FIG. 2a is a cross-sectional view of yet another aspect of the hydrocarbon adsorber system of the invention showing a non-symmetrical can design and an adsorber construction in which the hole or region of less obstructed flow is positioned along the exhaust path of least resistance.

This observed flow dynamics is illustrated in FIG. 1 for an oval extruded honeycomb substrate centrally disposed in an oval can design. The flow rates through various sections of the substrate were measured using six probes whose relative positions across the substrate cross-section are shown in the inset. To determine the flow profile across the substrate cross-section, the substrate was contacted with air at space velocities ranging from relatively low (30 cubic feet per minute (CFPM), line a) to high (150 CFPM, line f) space velocities. As shown in FIG. 1, at the lower velocities, the air flow across the substrate cross-section as measured by probes 1 through 6, is fairly uniform. The position of the probes across the substrate cross-section is indicated by the numbers 1–6 in the insets. As the space velocity increases, the flow profile becomes increasingly variable, with the flow rate at and near the center of the substrate being higher than the flow rates through the peripheral regions. Similarly, for an adsorber disposed in a non-symmetrical can design such as shown in FIG. 2a, the same tendency is observed. The flow profile of the can design of FIG. 2a for a honeycomb adsorber having a uniform cross-section (that is, without an open flow region such as a hole or larger cells) is shown in FIG. 1a. Again, flow through the region of the adsorber found along the flow path of least resistance (regions 4–6), is faster than the flow rate through the peripheral region (marked 1-3, i.e., the region away from the path of least resistant flow).

We have found that by taking advantage of the above-described flow dynamics, the light-off time of the burn-off catalyst can be significantly reduced. In particular, for the cone can design for example, we have discovered that by leaving the central region of the substrate open or substantially less obstructed than the peripheral regions, the flow dynamics observed in the extruded honeycomb adsorber (FIG. 1), can be enhanced.

In one particularly useful embodiment (FIG. 2), the hydrocarbon adsorber 10 is formed with a hole or open flow region 15 in the center as illustrated in the figure. In this embodiment, a portion of the exhaust gas stream is allowed to flow through the center of the adsorber directly to the burn-off catalyst to quickly bring the burn-off catalyst to its light-off temperature in a significantly shorter period of time than would be required using a regular honeycomb adsorber with no hole. Preferably, the burn-off catalyst attains its light-off temperature before the adsorber attains its desorption temperature to avoid premature desorption which will result if the timing were reversed. The amount of exhaust needed to achieve this goal will vary for each system and must be determined by experimentation. However, the amount should be sufficient to bring the burn-off catalyst to its light-off temperature, but not so large as to force adsorbed hydrocarbons to escape from the adsorber. For the cone can design used in the experiment, less than approximately of the exhaust gas volume was sufficient to bring the burnoff catalyst to its light-off temperature in a very short period of time and before the adsorber had reached its desorption temperature. For systems where an electrically heated catalyst or a heating device is close coupled with the engine, the amount of exhaust gases that would required to bring the burn-off catalyst to its light-off temperature may be as low as 5–20% depending on the particular exhaust system configuration.

Figure 3:
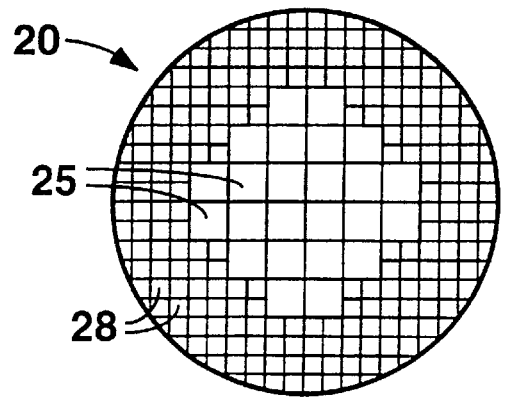
FIG. 3 is a cross-sectional view of another embodiment of the hydrocarbon adsorber of the invention having large central cells and smaller peripheral cells.

Similar results can be obtained by constructing the adsorber in any shape wherein there is less obstructed flow through the exhaust path of least resistance. For the cone can design in which a generally circular adsorber is centrally disposed in a cone-shaped can such as in FIG. 2 preferably, the region of less obstructed flow 15 is along the central region of the adsorber so that flow through the center is less restricted than through the peripheral region. In addition to the construction having a hole through the center, the adsorber can also be a honeycomb structure, preferably an extruded honeycomb structure 20 in which the cells 22 forming the central region 25 are larger than those forming the peripheral region 28 as illustrated in FIG. 3. For a non-symmetrical can design (FIG. 2a), the adsorber 30 can be constructed with a region of less restricted flow 32 having a hole or larger cells, displaced from the center as illustrated in FIG. 2A; alternatively, the hole can be cut into the edge of the honeycomb structure along its length. Here, the exhaust flow path of least resistance is along an exhaust stream connecting the engine (optionally through a light-off catalyst 35) to the burn-off catalyst 40. Therefore, the unobstructed flow region (hole or larger cells) is positioned along this path, preferably in the region marked 4-6 in FIG. 2a.

Figure 4:
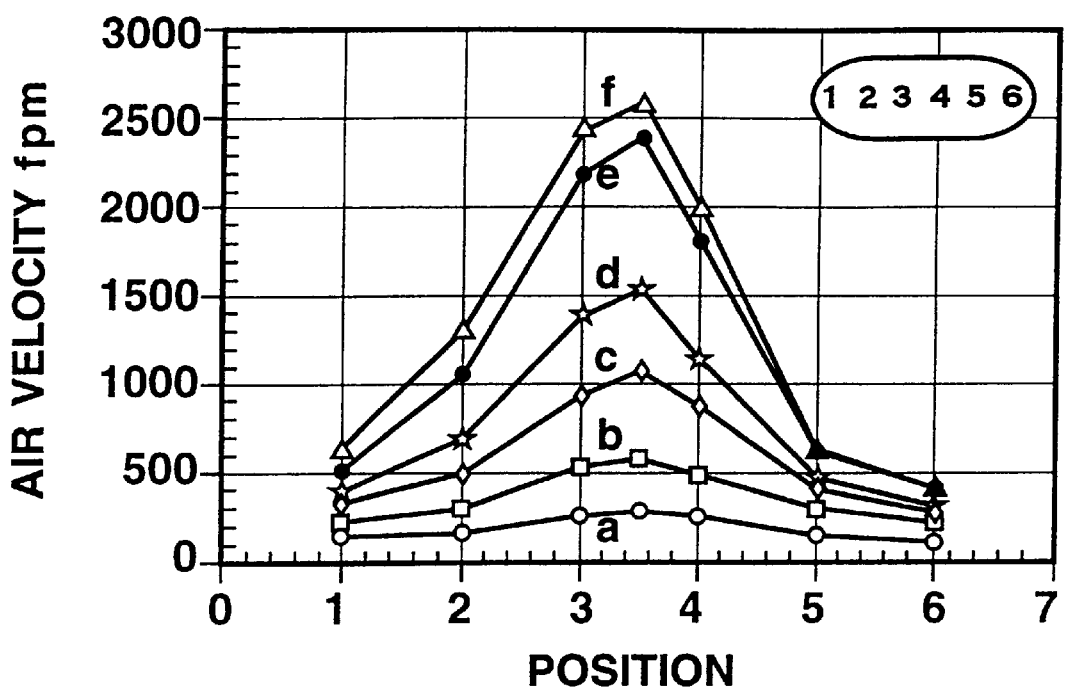
FIG. 4 is a graph showing the flow profile across a similar oval honeycomb substrate but one having a 0.50" hole cut through its center.
Figure 5:
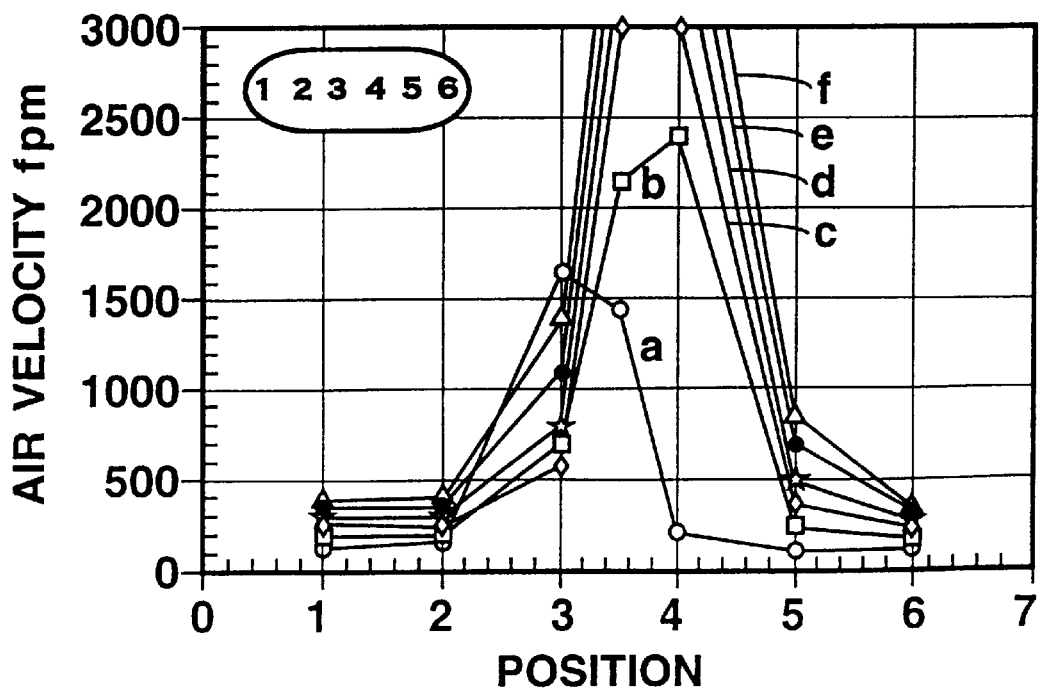
FIG. 5 is a graph showing the flow profile through a similar oval honeycomb as in FIG. 4, but one having a 0.75" hole cut through its center.

This flow dynamics is further illustrated in FIGS. 4 and 5, in which a 0.5" and 0.75" hole respectively, have been cut out of the center of two oval extruded honeycomb structures in oval cans. As shown in the figures, the flow rate through the central region of the substrates is significantly higher than observed in the regular substrate with no hole in the middle (FIG. 1). Further, it is observed that the flow rate through the central region of the adsorber is higher for the monolith having a 0.75" size hole in its center than for the monolith having a 0.5" hole. This variation in flow rate becomes more pronounced as the space velocity increases from 30 CFPM (line a) to 150 CFPM (line f) in both cases, as was observed in FIG. 1.

In the exhaust system of the invention, the burn-off catalyst comes to its light-off temperature quicker because the portion of the exhaust flowing through the central hole, avoids contact with the adsorber which has a certain mass and which therefore acts as a heat sink. Whereas, the unrestricted flow through the hole causes the heat in the exhaust stream to be transferred directly to the burn-off catalyst downstream from the adsorber. At the same time, since a substantial portion of the exhaust gases flow through the hole, a small portion of the exhaust gas stream passes over the adsorber where hydrocarbons are adsorbed and held until the adsorber attains its desorption temperature. We have found that by using the construction described herein, the burn-off catalyst reaches its light-off temperature before the adsorber attains its desorption temperature, thus avoiding premature desorption which has been a problem with some existing adsorption systems. The time required to bring the burn-off catalyst to its light-off temperature can be further reduced by placing a main catalytic converter having a light-off temperature, upstream from the adsorber, and downstream from the engine. Examples of useful main catalytic converters for this application include any three-way catalyst, a light-off catalyst, an oxidation catalyst, an electrically heated catalyst and the like. Alternatively, instead of a main catalyst, a heating device such as a heated honeycomb structure or an electrically heated catalyst can be disposed in the same position, close coupled to the engine to heat up the exhaust gas stream. Due to its closer proximity to the engine, the main catalytic converter attains its light-off temperature sooner than does the burn-off catalyst which is further downstream. The adsorber system of the invention allows heat from the main catalyst to reach the burn-off catalyst significantly faster than with conventional adsorber systems. As a result, the burn-off catalyst in the exhaust system of the invention, attains its light-off temperature at a faster rate than observed with other systems.

Figure 6:
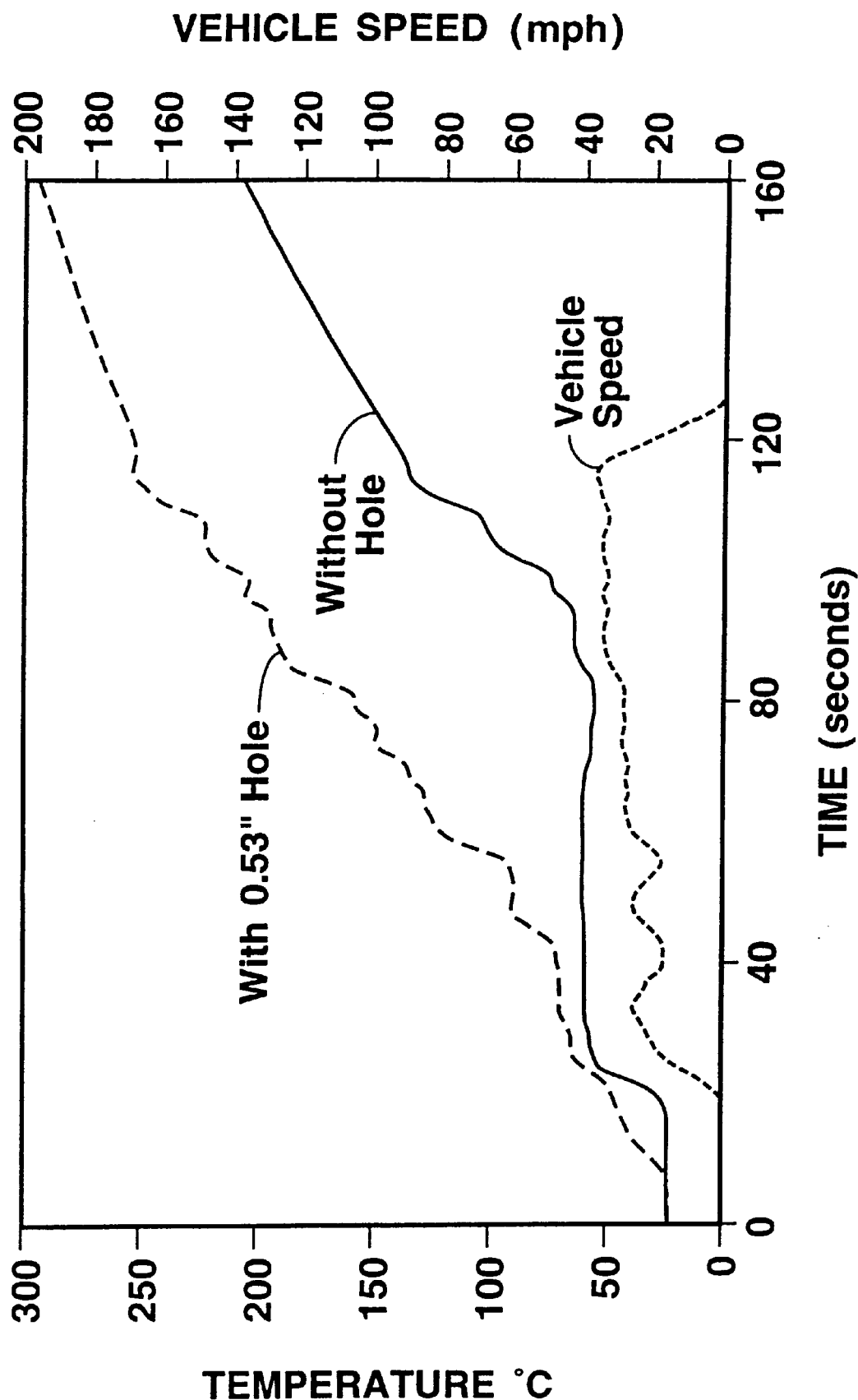
FIG. 6 is a graph showing the burnoff catalyst inlet temperature as a fuinction of time and vehicle speed for the system of FIG. 2.
Figure 7:
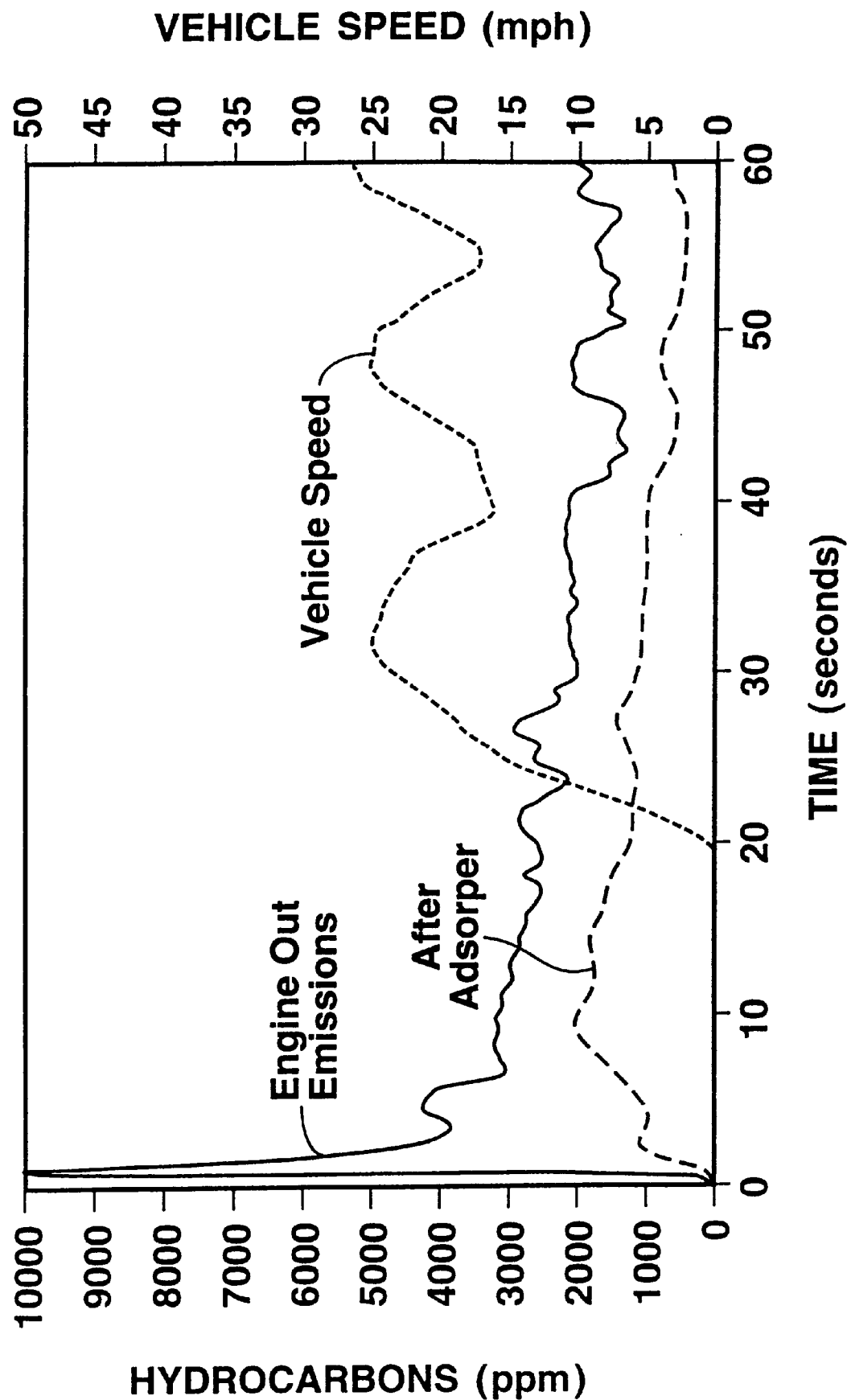
FIG. 7 is a graph showing the hydrocarbon emissions on both the inlet and the outlet ends of the adsorber on FIG. 2 as a function of time and vehicle speed.
Figure 8:
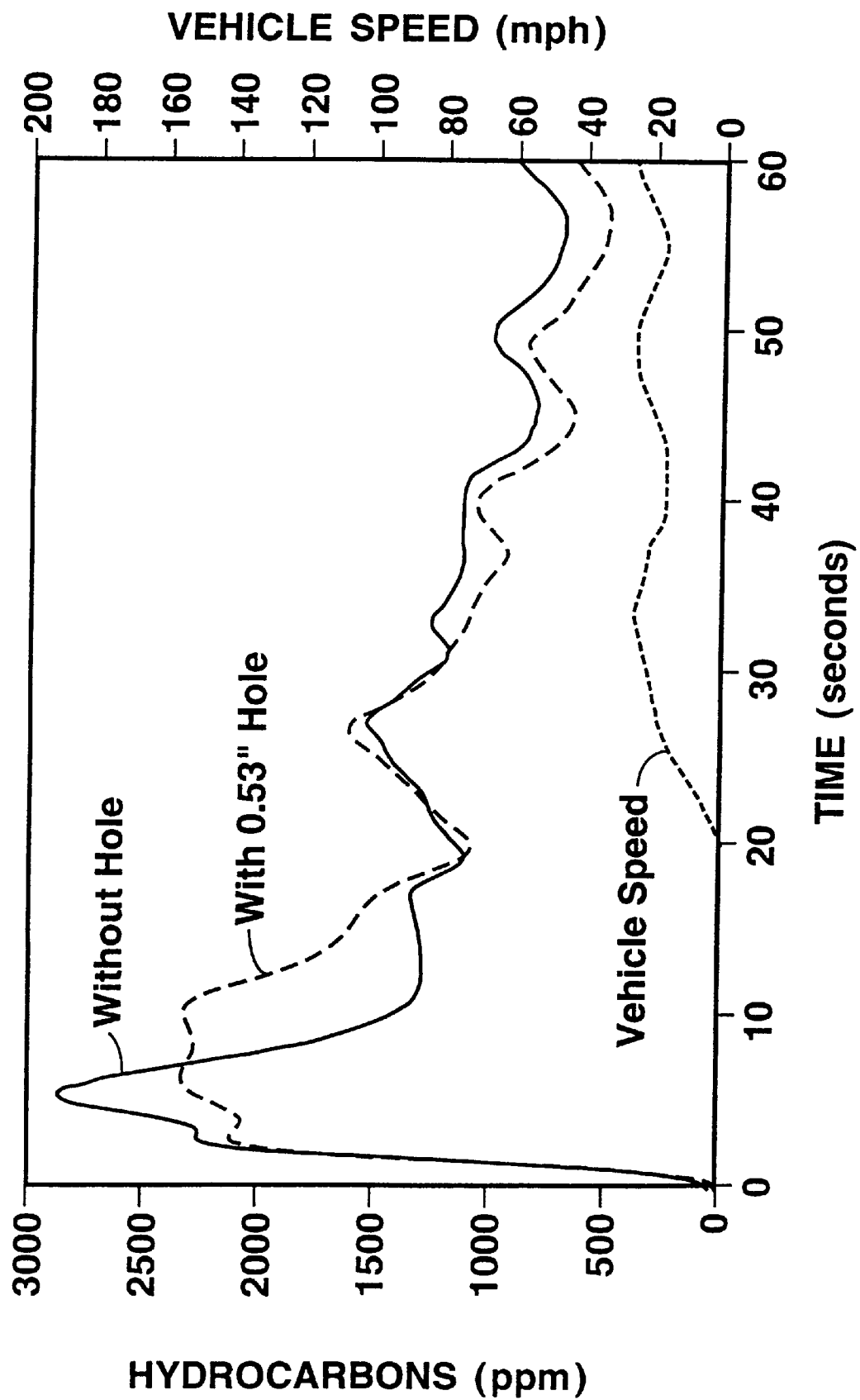
FIG. 8 is a graph comparing the adsorption efficiency of the adsorber of the invention with the adsorption efficiency of a standard adsorber having no open flow region.

This and other advantages of the adsorber of the invention are illustrated in FIGS. 6–8. FIG. 6 compares the inlet temperature of the burn-off catalyst when used in conjunction with an adsorber having a 0.5" central hole, with the burn-off inlet temperature when placed downstream of a standard cellular adsorber without the central opening. As shown in the diagram, the inlet temperature of the burn-off catalyst is higher for the adsorber of the invention (i.e., with the hole), than it is for a standard adsorber without the hole. In fact, in the design of the invention, the temperature of the burn-off catalyst increases steadily and rapidly from engine start-up, and the burn-off catalyst attains light-off significantly sooner than the standard design. For example, after only about 90 seconds from engine start-up, the inlet temperature of the burn-off catalyst using the adsorber of the invention, had reached about 200° C. On the other hand, in the standard adsorber (that is, without the central hole), the burn-off inlet temperature does not reach 200° C. until more than 150 seconds had elapsed from engine start-up.

As shown in FIG. 7, the presence of the hole in the central region of the adsorber has little or no adverse effect on the adsorption efficiency as determined by comparing the hydrocarbon emission at the engine, with the emission at the outlet end of the adsorber. A significant amount of the hydrocarbon emitted from the engine is adsorbed by the adsorber. Similarly, it is believed that the presence of the hole does not result in any significant loss of adsorption efficiency. This is illustrated by FIG. 8 which compares the hydrocarbon emission at the outlet end of a cellular adsorber having a 0.5" hole in its center, with a standard cellular adsorber. As seen in the diagram, there is little noticeable difference between the adsorption efficiency of the adsorbers.

Once the light-off catalyst has attained its light-off temperature it soon attains its full operating temperature and is then capable of converting the NOx, hydrocarbon, and carbon monoxide in the exhaust stream. Heated exhaust gases passing through the now hot light-off catalysts soon brings the burn-off catalyst to its light-off temperature. As stated above, we have observed that in the present design, the adsorber reaches its desorption temperature only after the burn-off catalyst has attained its full operating temperature. Once the adsorber reaches its desorption temperature, any trapped hydrocarbons are desorbed or released from the adsorber into the exhaust stream and thence to the burn-off catalyst where the hydrocarbons are converted to innocuous products and discharged into the atmosphere. Preferably, after the burn-off has attained light-off, a portion of the exhaust gas continues to flow through the peripheral region of the adsorber to aid in the desorption of hydrocarbons.

We have found that air flow through the central hole region can be controlled using flow diverters which may be placed on the inlet or outlet end of the adsorber as shown in FIGS. 9a to 9e. Relying on fluid dynamics (fluidics), during cold start the flow diverters are used to divert exhaust gases away from the open flow central region (or hole), and towards the peripheral regions of the adsorber. This is achieved by projecting a jet of secondary air into the exhaust gas flow path to divert the exhaust gas flow in a desired direction. The spray pattern from each of the nozzles is further illustrated in the diagrams.

During cold-start the flow diverter is placed on the inlet end of the adsorber housing as shown in FIG. 9a to direct exhaust gas flow away from the hole and into the adsorber as shown. Alternatively, the flow diverter can be placed at the outlet end (downstream) of the adsorber as shown in FIG. 9b, to redirect exhaust gases through the adsorber. For certain applications where the initial speed during cold start is considerably high, or where the engine exhaust is particularly high in hydrocarbons, flow diverters may be placed both at the inlet and outlet end locations to ensure that a substantial amount of the exhaust gas stream is directed through the adsorber during cold start. When the light-off catalyst has attained its light-off temperature, the flow diverter is deactivated, thus allowing the exhaust gases which by now are relatively hot, to flow to the burn-off catalyst through the open core central region and thereby quickly bring the burn-off catalyst to its light-off temperature. After the burn-off catalyst has attained its light-off temperature, some portion of the exhaust gases continue to flow through the adsorber to aid with desorption.

During cold start, the flow diverters operate by projecting at high velocity, a small jet of secondary air stream from a secondary air source, into the engine exhaust stream to divert the exhaust gas flow away from the central hole, and towards the peripheral region of the adsorber.

The diverter can be in various forms. Preferably, the diverting means is such as to present as little obstruction to exhaust flow as possible when no secondary air pattern is present. For example, in one embodiment (FIG. 9a), the flow diverting means is a thin tubular air injection port 57, running parallel to the exhaust gas flow and fitted with a small cone-shaped nozzle 60, positioned at the inlet end of the adsorber housing, through which secondary air in the form of a cone-shaped jet 65 can be injected into the housing to effectively block off exhaust gas passage through the hole as shown. The nozzle 60 is capable of projecting a cone-shaped air stream 65 from a secondary air source, to divert the exhaust gases towards the peripheral region 50 of the adsorber and away from the central hole 15 during cold start by blocking passage of exhaust gases through the hole. The nozzle 60 can consist of any directional air outlet capable of directing secondary air stream to effectively form a shield to prevent exhaust gas flow through the region of the adsorber along the exhaust path during cold start. In the embodiment illustrated, during cold start, the flow diverting means is activated by allowing secondary air to pass through the air injection port 57 to the nozzle 60. The nozzle 60 is constructed such that the secondary air forms an umbrella-like shield in front of the hole or central region of the adsorber thereby diverting flow away from the hole 15 and into the peripheral regions 50 of the adsorber.

Alternatively, the air injection port 57 and the cone-shaped nozzle 60 can be positioned at the outlet end of the adsorber to redirect exhaust gases back through the hole during cold start as shown in FIG. 9b.

In another embodiment (FIG. 9c), the diverter is a circular, tubular air injection port 45 fitted with a plurality of preferably small cone-shaped, directional nozzles 47 as shown. In this embodiment, after the light-off catalyst has attained its light-off temperature, the cone-shaped flow diverter 60 is deactivated and secondary air jets 65 are allowed to project from nozzles 47 of air injection port 45 to deflect or divert a substantial portion of the engine exhaust stream toward the hole 15 and away from the peripheral regions 50 of the adsorber as indicated.

Figure 9C:
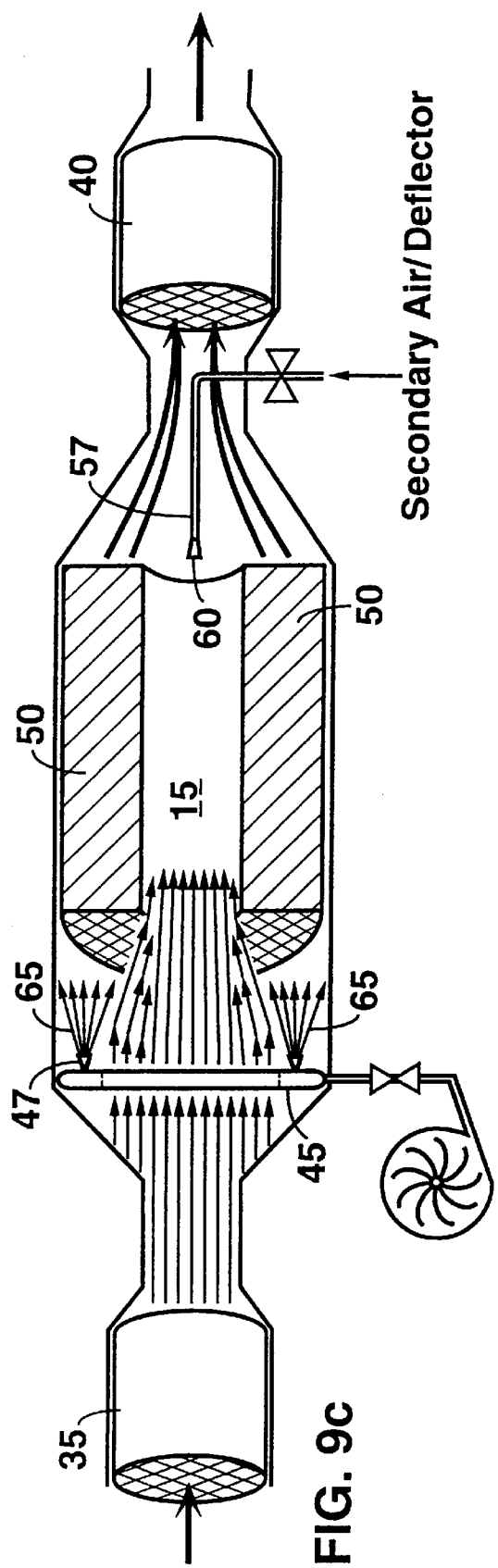
Figure 9D:
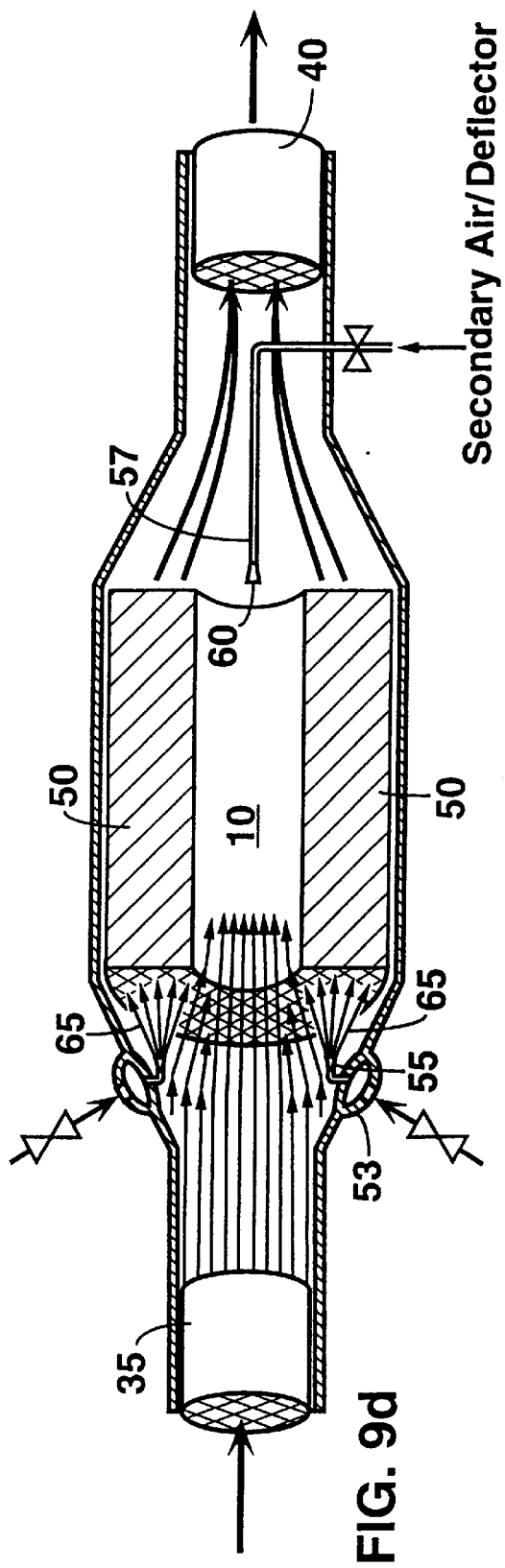

Similarly, secondary air jets for diverting flow after light-off may be introduced into the housing through an air injection collar 53 having a plurality of cone-shaped directional nozzles 55 as shown in FIGS. 9d and 10. As with the circular air injection port of FIG. 9c, here again, before light-off, flow through the center region is prevented by use of a flow diverter positioned at the outlet end of the adsorber as shown in FIG. 10, to redirect exhaust gas flow back through the center and through the peripheral region of the adsorber. Alternatively, the air injection port 57 may be further elongated to extend from the outlet to the inlet end of the adsorber such that the nozzle 60 is disposed in front of the hole 15 on the inlet end of the adsorber.

After light-off, flow through nozzle 60 is discontinued and secondary air flow through the nozzles 55, are used to effectively force a large portion of the engine exhaust gases through the hole 15 as shown in FIGS. 9c and 9d to quickly bring the burn-off catalyst to its effective light-off temperature. While the tubular air injection port and the air injection collar are shown on the inlet end of the housing, such devices may also or instead be located on the outlet end of the adsorber housing to redirect air away from the hole in the same manner described above.

Figure 9E:
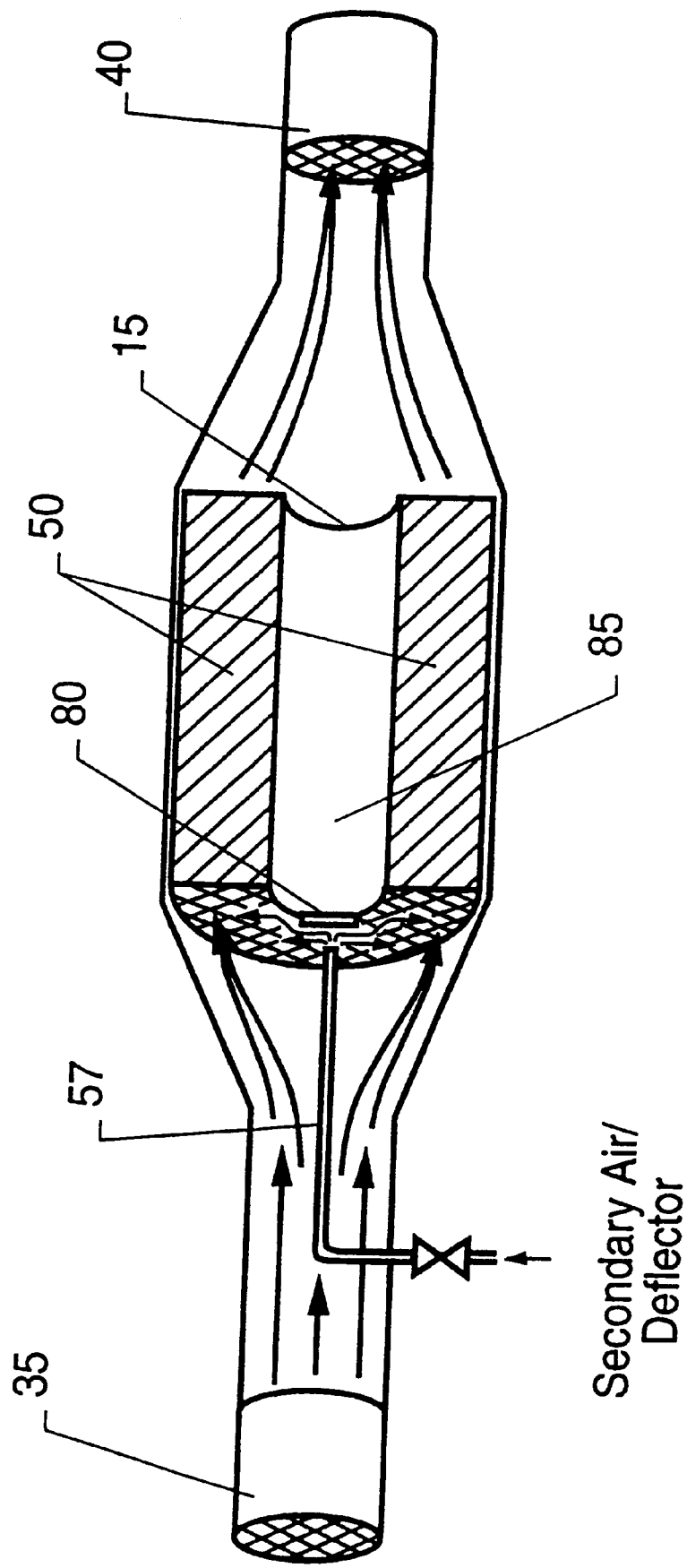

In a another embodiment, as depicted in FIG. 9e, the diverter comprises the thin tubular air injection port 57, running parallel to the exhaust gas flow and fitted with a diverter plate 80, positioned at the inlet end of the adsorber housing, through which secondary air in the form of a radially directed jet 85 can be injected into the housing to effectively block off exhaust gas passage through the hole as shown. Preferably, the direction of the jet is approximately perpendicular to the direction of the exhaust gas flow. The air injection port 57 coupled with the diverter plate 80 are capable of projecting an air stream 85 from a secondary air source, to divert the exhaust gases towards the peripheral region 50 of the adsorber and away from the central hole 15 during cold start by blocking passage of exhaust gases through the hole. In other words, the air injection port 57 coupled with the diverter plate 80 combine together to direct a secondary air stream to effectively form a shield to prevent exhaust gas flow through the region of the adsorber along the exhaust path during cold start. In the embodiment illustrated, during cold start, the flow diverting means is activated by allowing secondary air to pass through the air injection port 57 to the diverter plate 80. The diverter plate 80 diverts the secondary air forming a radially directed air shield in front of the hole or central region of the adsorber thereby diverting flow away from the hole 15 and into the peripheral regions 50 of the adsorber.

Figure 13:
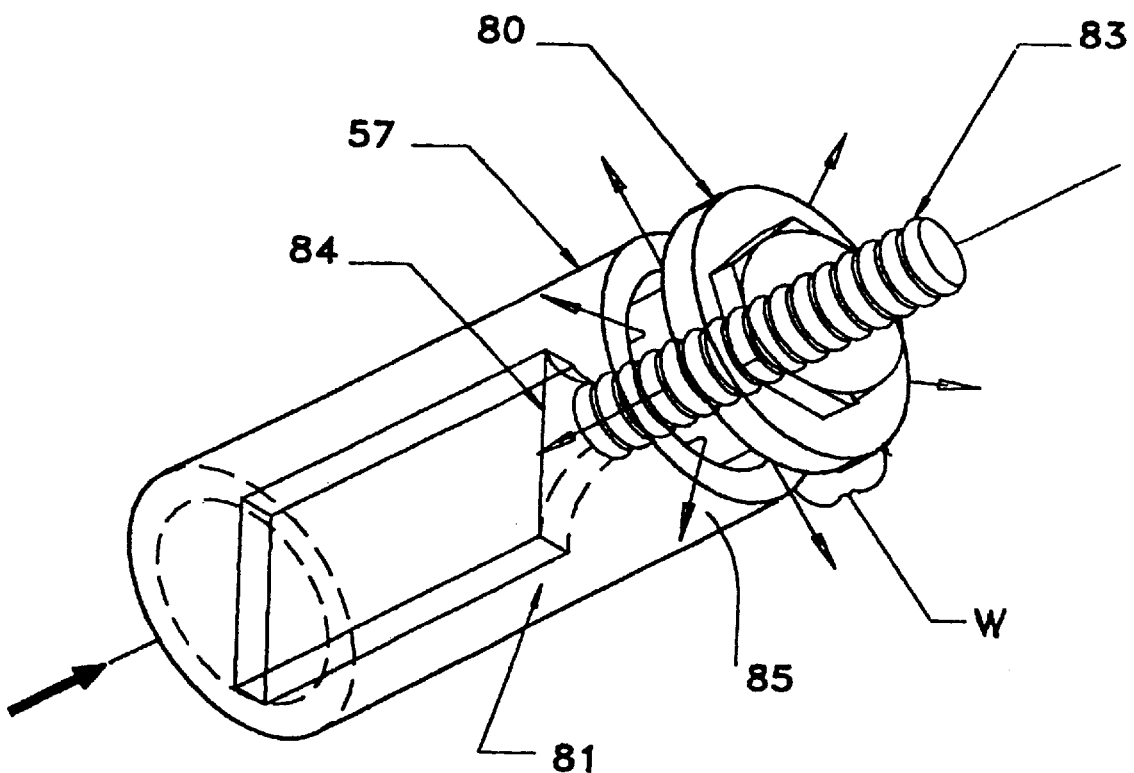

FIG. 13 illustrates, in more detail, the flow diverter means used in the preferred embodiment illustrated above in FIG. 9e. The diverter plate 80 is positioned, a variable slot distance W, in front of the outlet of the air injection port 57, through the use of a diverter plate support system 82. Diverter plate support system 81 consists of a support member which is secured within the inside circumference of the tubular injection port and a threaded post 83 which extends out of the air injection port 57. Diverter plate 80 is directly attached to threaded post 83 allowing for the slot width to be varied. It should be noted that, although the preferred slot width is that width which results in an air flow which is perpendicular to the direction of the exhaust gas, the slot width may be increased resulting in a radial flow which is more cone-like in shape.

Depending on the particular application, the engine exhaust system of the invention can be constructed with any one or a combination of air flow diverters. For example, an exhaust system can comprise a tubular air injection port having a plurality of cone-shaped directional nozzles, an air injection collar having a plurality of nozzles, a tubular air injection port possessing a cone-shaped air injection nozzle, a tubular air injection port possessing a diverter plate, an air injection tube, an air "knife" and/or combinations of these. Similarly, an exhaust system of the invention can comprise diverters at the inlet end, the outlet end, or on both ends of the adsorber housing.

Preferably, the flow of the secondary air source is at high velocity immediately after engine start-up in order to sufficiently direct all or substantially all of the engine exhaust gases away from the hole. During cold-start, secondary air flow through the diverter, though at low volume is able to achieve significant jet (strength) due to its high velocity. As the engine speed increases, and as the exhaust gas temperature begins to increase, the velocity of the secondary air jet may be gradually reduced to allow more exhaust gas to flow through the hole in order to heat up the burn-off catalyst. After the burn-off catalyst has reached its light-off temperature, flow of secondary air may be terminated to allow substantially free and unobstructed flow of the exhaust gases through the hole. Preferably, the size of the diverter is small compared to the size of the housing and the exhaust pipe so that after the secondary air source is discontinued exhaust gas flow through the hole is not significantly affected by the presence of the diverter.

As described above, after light-off secondary air flow is desirable to effect combustion of desorbed hydrocarbons. Additional air needed for oxidation may be provided through an auxiliary secondary air source which is preferably placed at the outlet end of the housing just upstream from the burn-off catalyst. Alternatively, after light-off, and after the flow diverter has been deactivated, secondary air may be passed into the adsorber and housing through a plurality of nozzles formed around a circular air injection port or preferably through an air injection collar similar to that shown in FIGS. 9c through 10. After the adsorber is fully desorbed of hydrocarbons, the secondary air pattern may be discontinued. This flow of secondary air into the adsorber also provides the added advantage of diverting the exhaust gases away from the adsorber and through the hole as described above.

Secondary air from the same or a separate source may also be used as needed during vehicle operation to control the adsorber temperature. For example, after the engine has heated up, secondary air can be injected into the adsorber in the same manner described above, to provide cooling air to the adsorber after the engine has heated. This additional secondary air will operate to maintain the adsorber at temperatures below its desorption temperature in the period prior to the burn-off catalyst attaining its light-off temperature to prevent premature desorption. In addition, secondary air may be introduced into the housing at any time as needed for example, to restore stoichiometry, or in certain applications, to provide additional air that may be necessary for oxidation.

Although nonlinear, we have found that the larger the hole size, the greater the proportion of exhaust gases that flow through the hole and the central region of the adsorber. Preferably, the hole size or the size of the large cells in the central region of the adsorber are such as to allow a sufficient amount of the exhaust gases to flow through the adsorber during cold start to meet the Federal Test Procedure (FTP) standards. At the same time, the hole size should be such as to allow a sufficient amount of exhaust gases to reach the burn-off catalyst so as to quickly bring it to its light-off temperature. The optimal hole size for a given application may be determined experimentally and will depend on such factors as the engine size, the volume of the adsorber, the geometric surface area of the adsorber, the efficiency of the particular adsorber material, the operating conditions and other variables.

In the following examples, a round cordierite extruded honeycomb substrate having an outside diameter of 4.66 inches, and a frontal area of 17.05 square inches, was cut into six samples each measuring 4 inches in length. Three of the samples were washcoated with ZSM-5, a zeolite known to adsorb low molecular weight hydrocarbons. The remaining three samples were washcoated with ultra stable Y (USY), a zeolite known to have good adsorption capacity for higher molecular weight hydrocarbons. One of the ZSM-5 coated samples was drilled with a hole through its center measuring 0.5" and another with a hole measuring 0.75" running longitudinally between the two end faces of the substrate and parallel to the cells. Similarly, one of the USY coated samples was drilled with a hole measuring 0.5" and another with a hole measuring 0.75". The control adsorber consisted of one each of the ZSM-5 and USY coated samples without holes.

In the first experiment, the ZSM-5 coated adsorber sample 70 having a 0.5" hole was placed in the adsorber housing, in series with the USY-coated sample 75 also having a 0.5" hole, with the holes lined up as shown in FIG. 11. Similar experiments were staged using the 0.75" hole samples and the control samples having no holes. Using a 3.8 liter engine, the samples were tested using the FTP test. No flow diverters were used in these experiments. During cold-start the amount of hydrocarbons passing through the control adsorber (no holes) as determined by the hydrocarbon emission at the outlet end of the adsorber housing, was in the range of 60–65%. In other words, the control results indicate that some 35–40% of the hydrocarbons emitted from the engine during cold start were not adsorbed., i.e., the hydrocarbons passed through the open cells of the honeycomb adsorber or were otherwise not picked up by the adsorber. For the set of adsorbers having the 0.5" holes the amount of hydrocarbons passing through the adsorber, and therefore actually adsorbed, was in the range of 50–55%. And for the adsorber having a 0.75" hole, the amount of hydrocarbons passing through the adsorber, and therefore adsorbed, was in the range of 35–40%.

Figure 12:
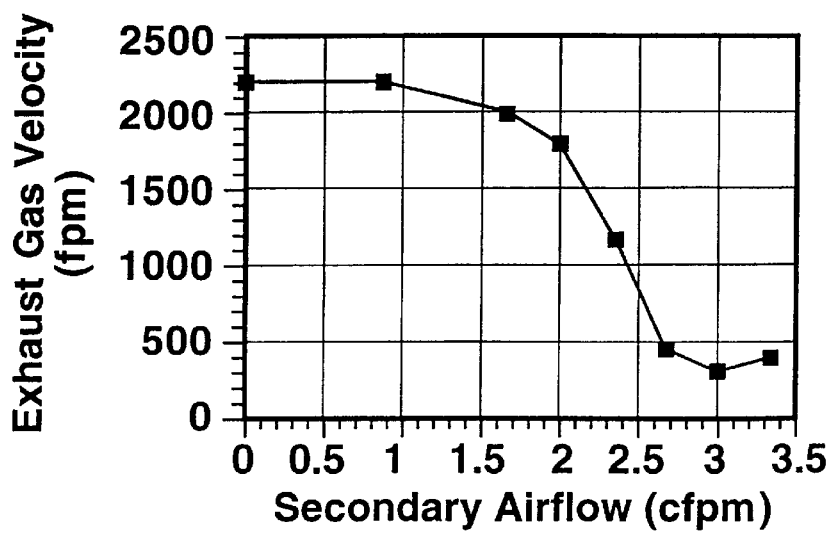
FIG. 12 is a graph showing the exhaust gas velocity measured in the center of the hole on the outlet end of the adsorber as a function of the volumetric flow rate of the secondary air of the diverter before light-off; and, FIG. 13 is an enlarged illustration of the air injection tube/diverter plate configuration depicted in FIG. 9e.

By forming the 0.5" and 0.75" holes which represent 1.15% and 2.58% of the adsorber frontal area respectively, the amount of resulting unadsorbed hydrocarbons increased by 10% and 25% respectively. At the same time however, the burn-off catalyst attained light-off significantly quicker with the holes because heated exhaust gases from the main catalyst reached the burn-off catalyst in a shorter period of time than without the holes. Accordingly, it is contemplated that even without the use of diverters, adsorbers having holes of sizes ranging from about 0.5% up to about 50% of the adsorber frontal area will be useful for the practice of the invention. As described above the preferred adsorber frontal area hole size area should be empirically determined for each system designed taking into account the aforementioned factors such as engine size, the volume of the adsorber et al. With diverters, much larger hole sizes can be used since the diverter can be used to ensure that exhaust gases do not pass through the hole before light-off To illustrate the effectiveness of the fluidic flow diverter of the invention as measured by the degree to which hydrocarbon-bearing exhaust gas is successfully prevented from passing through the hole during cold start, the following experiment was done. With the diverter activated in a configuration similar to those illustrated in FIGS. 9a, 9b and 10, exhaust gas was simulated by passing air into the adsorber housing at a volumetric flow rate of 40 cubic feet per minute (cfpm). An elongated flow diverter was placed in the housing along the center of the hole, extending from the outlet to the outlet end of the adsorber such that the cone-shaped nozzle is disposed in front of the hole at the inlet end of the adsorber. With the simulated exhaust gas flowing at the specified rate, the flow diverter was activated by passing secondary air to form a cone-shaped air shield over the entrance of the hole. Using a probe positioned in the region of the hole at the outlet end of the adsorber, the linear velocity of the exhaust gas (simulated) passing through the hole was measured as a function of the secondary air volumetric flow rate given in the graph in cubic feet per minute (cfpm). The results are plotted in FIG. 12. As shown, as the secondary air flow rate increases, the exhaust gas is increasingly diverted to the peripheral regions of the adsorber as indicated by the decrease in the exhaust gas flow rate through the hole as measured by the probe. The higher the secondary air flow rate, the stronger the air jet, and the more the amount of exhaust gas diverted. Specifically, the flow rate of the exhaust gas measured at the outlet of the hole falls from a maximum or about 2300 linear feet per minute with no diverter, to about 300 fpm at a secondary air flow of about 3 cfpm.

Even though the adsorber used in the above examples consisted of two cordierite monoliths washcoated with different molecular sieve materials and used in combination as described, other constructions and assemblies are possible and will be clear to those skilled in the art. For example, instead of washcoating different monoliths with different zeolites, the adsorber can also consist of one monolith washcoated with one or a mixture of different molecular sieve materials (in this case, zeolites). Also, instead of washcoating a substrate with the zeolites, the adsorber can consist of an extruded zeolite formed in the manner described hereinafter. Without intending to be bound by theory, it is postulated that the washcoated cordierite specie of adsorber may adsorb more hydrocarbons because it tends to stay cooler for a longer period of time, thereby avoiding premature desorption which results when the adsorber reaches its desorption temperature before the burn-off catalyst attains light-off. This tendency to remain cooler for a longer period of time is believed to be aided by the presence of the much denser cordierite substrate which acts as a heat sink thus absorbing some of the heat. In contrast, when the adsorber consisted of an extruded zeolite (which is less dense than cordierite), the cooling effect was reduced. To achieve the same cooling effect with extruded zeolite adsorbers, in another experiment a cordierite mass (such as an extruded cordierite body) was placed in the housing, upstream from the extruded zeolite. The same cooling effect observed with washcoated cordierite substrates was again observed. It is expected that any similar structure capable of acting as a heat sink can be used to achieve the same result where premature desorption may be a problem.

By using flow diverters as described above, adsorbers having larger hole sizes or more open central regions can be used since the diverter can be used to direct substantially all of the exhaust gases away from the central region and into the peripheral regions. In this embodiment using flow diverters, the hole size may be as high as 50% of the adsorber frontal area or more provided that the remaining adsorber is capable of adsorbing a sufficient amount of the hydrocarbons during cold start to meet the FTP test standards.

In one particularly useful embodiment, during cold start, substantially all of the exhaust gases entering the adsorber housing are diverted to the adsorber and away from the hole using flow diverters disposed either in the inlet end of the adsorber housing, the outlet end, or on both ends of the housing. In this embodiment, potentially all of the exhaust gases entering the housing are forced to pass through the adsorber until the main catalyst attains its light-off temperature. Once the main catalyst reaches its light-off temperature, the amount of hydrocarbons contained in the exhaust stream entering the adsorber housing becomes sufficiently low. Therefore, as soon as the main catalyst attains light-off, the diverters are adjusted or deactivated to allow the maximum amount of exhaust gases to pass through the hole and thereby bring the burn-off catalyst to its light-off temperature.

Useful molecular sieve materials for the invention include silicates (such as the metallosilicates and titanosilicates) of varying silica-alumina ratios, metalloaluminates (such as germaniumaluminates), metallophosphates, aluminophosphates (such as silico-and metalloaluminophosphates (MeAPO, SAPO, MeAPSO), gallogerminates and combinations of these. Examples of useful metallosilicates include zeolites, gallosilicates, chromosilicates, borosilicates, ferrisilicates. Examples of zeolites which are particularly useful for the invention include, ZSM-5, Beta, gmelinite, mazzite, offretite, ZSM-12, ZSM-18, Berryllophosphate-H, boggsite, SAPO-40, SAPO-41, and combinations of these, most preferably, ZSM-5, Beta, Ultra-stable Y (USY), and mordenite. For such applications, zeolites having high silica/alumina ratios (greater than 10), are more thermally stable and are therefore preferred. Furthermore, it is contemplated that applications maintained under reducing conditions, activated carbon may be the material of choice.

It is well known that during cold start, molecular sieve zeolites not only trap hydrocarbons but also cause cracking of some hydrocarbons (i.e., coking). To prevent coking, the adsorber may be catalyzed with suitable catalysts. As is well known in the art, noble metal oxidation catalysts such as platinum, rhodium, and palladium, may be added to zeolite molecular sieve to ensure oxidation of the carbonaceous materials which may result from coking. Any catalyst capable of converting hydrocarbons to water and carbon dioxide may be added to the zeolite. Such catalysts are well known in the art. For example, noble metal catalysts, such as platinum, rhodium, palladium, and mixtures of these are widely used in automotive catalytic converters. These catalysts are capable not only of oxidizing hydrocarbons but also of converting carbon monoxide and NOx in the engine exhaust stream to innocuous products. Such catalysts may be incorporated into the adsorber or molecular sieve structure by known methods. It is also known that certain zeolite/noble metal combinations such as disclosed in co-assigned U.S. Pat. No. 5,244,852 (herein incorporated by reference) function as three-way catalysts to convert.

As discussed above, three-way converters which additionally convert NOx and carbon monoxide to non-toxic by-products may also be used in the practice of the invention. Typically, three-way catalysts used in automotive applications comprise noble metals such as platinum and/or palladium, and rhodium. Examples of such catalysts include platinum/palladium/rhodium on gamma alumina with rare earth oxides (e.g., ceria), and platinum on ceria-alumina combined with rhodium on zirconia.

The hydrocarbon trap or molecular sieve structure of the invention, may be utilized in any number of forms. For example, the molecular sieve or zeolite may be utilized directly in the form of beads or pellet, or it may be embedded in, or coated on porous substrates. The molecular sieve material can be applied onto the substrate by any known method such as for example, by conventional washcoat or spraying techniques. In the washcoat technique, the substrate is contacted with a slurry containing the molecular sieve and other components such as temporary binders, permanent binders or precursors, dispersants and other additives as needed. Such methods are well known in the art. The permanent binder in the slurry includes for example, aluminum oxide and its precursors, silica, titania, zirconia, rare earth oxides, and their precursors, spinel and precursors. The molecular sieve slurry is then applied (for example, by repeated spraying or dipping) to the substrate until the desired amount of molecular sieve material has been applied. One useful method for forming zeolite on the surface of a substrate is disclosed in U.S. Pat. No. 3,730,910, herein incorporated by reference.

In one particularly useful embodiment, the molecular sieve is zeolite in the form of a porous monolithic structure formed by extruding the zeolite into a honeycomb structure U.S. Pat. No. 4,381,255, herein incorporated by reference, discloses a process for producing binderless zeolite extrudates by extruding a mixture containing equal amounts of a zeolite powder, a metakaolin clay and a near stoichiometric caustic solution, in which the clay in the extrudate crystallizes to form a coherent particle that is essentially all zeolite. Similarly, U.S. Pat. No. 4,637,995, herein incorporated by reference, discloses a method for preparing a monolithic zeolite support comprising a ceramic matrix having zeolite dispersed therein.

Another useful method of forming the molecular sieve structure includes embedding or coating zeolite on a metal, metal alloy, ceramic, or glass ceramic substrate, such as extruded honeycomb substrates, as disclosed in U.S. Pat. No. 4,657,880 herein incorporated by reference.

The adsorber can also be formed by in situ growth of zeolite, that is, by crystallizing zeolite on the surface of a metal, metal alloy, ceramic, or glass ceramic substrate. A method for crystallizing strong-bound zeolites on the surfaces of monolithic ceramic substrates is disclosed in U.S. Pat. No. 4,800,187, herein incorporated by reference.

The substrate can be any material suitable for high temperature application such as certain metals, metal alloys, ceramics, glass-ceramics, glass, high surface area-high temperature stable oxides, and combinations of these materials. Examples of useful substrate materials include, cordierite, mullite, clay, talc, zircon, zirconia, spinel, alumina, silica, borides, lithium aluminosilicates, alumina silica, feldspar, titania, fused silica, nitrides, carbides and mixtures of these. Useful metals for the substrate include, substrates formed of iron group metals such as Fe—Al, Fe—Cr—Al alloys, stainless steel, and Fe—Nickel alloys.

U.S. Pat. No. 4,631,267, herein incorporated by reference, discloses a method for producing a monolithic support structure for zeolite by (a) mixing into a substantially homogeneous body (i) a zeolite, (ii) a precursor of a permanent binder for the zeolite selected from the group consisting of alumina precursors, silica precursors, titania precursors, zirconia precursors and mixtures of these, and (iii) a temporary binder; and extruding the mixture to form a porous monolithic molecular sieve structure.

In addition to the embodiments discussed above, it will be clear to persons skilled in the art that numerous modifications and changes can be made to the above invention without departing from its intended spirit and scope.

We claim:

1. A method of treating a hydrocarbon-containing engine exhaust stream comprising: causing exhaust gases from an engine to flow through a main catalytic converter having a light-off temperature and thereafter through a molecular sieve structure and thereafter through a burn-off catalyst structure having a light-off temperature thereby forming an exhaust gas stream, wherein the molecular sieve structure has an inlet and outlet end disposed in a housing, a desorption temperature, and a first substantially unobstructed flow region, and a second more obstructed flow region abutting the first region, the first region being disposed in the exhaust stream such that the first region provides a substantially unobstructed flow path for the exhaust gases, the method further including, prior to the main catalytic converter attaining its light-off temperature, activating a secondary air source for diverting a substantial portion the exhaust gases away from said first region and toward said second region of the molecular sieve.

2. The method of treating a hydrocarbon-containing engine exhaust stream as claimed in claim 1 wherein, after the main catalytic converter has attained its light-off temperature, deactivating the secondary air to cause a substantial portion of the exhaust gases to flow back towards said first region and away from the second region.

3. The method of treating a hydrocarbon-containing engine exhaust stream as claimed in claim 2 wherein after the burn-off catalyst has reached its light-off temperature, activating the secondary air to cause at least a portion of the exhaust gases to flow into the second region of the molecular sieve structure to thereby desorb hydrocarbons therefrom.

4. The method of claim 3 wherein the desorbing involves further contacting the molecular sieve structure with the secondary air source to effect oxidation of the desorbed hydrocarbons and to cool the molecular sieve structure.

* * * * *